(12) United States Patent
Bezold et al.

(10) Patent No.: US 8,434,514 B2
(45) Date of Patent: May 7, 2013

(54) FLUIDIC CONTROL ELEMENT

(75) Inventors: Christian Bezold, Welssbach (DE); Patrick Mohs, Gerabronn (DE)

(73) Assignee: Buerkert Werke GmbH, Ingelfingen (DE)

( * ) Notice: Subject to any disclaimer, the term of this patent is extended or adjusted under 35 U.S.C. 154(b) by 279 days.

(21) Appl. No.: 12/948,880

(22) Filed: Nov. 18, 2010

(65) Prior Publication Data
US 2011/0133108 A1 Jun. 9, 2011

(30) Foreign Application Priority Data
Dec. 3, 2009 (DE) .............. 20 2009 016 447 U

(51) Int. Cl.
*F16K 11/052* (2006.01)
(52) U.S. Cl.
USPC .................. 137/625.44; 137/625.65
(58) Field of Classification Search ............... 137/625, 137/625.2, 625.44, 625.65; 251/298, 331
See application file for complete search history.

(56) References Cited

U.S. PATENT DOCUMENTS

| | | | | |
|---|---|---|---|---|
| 3,464,448 A | * | 9/1969 | Schmitz | 137/625.44 |
| 3,991,788 A | * | 11/1976 | Kull | 251/331 |
| 5,027,857 A | * | 7/1991 | Champseix | 137/625.44 |
| 5,139,226 A | * | 8/1992 | Baldwin et al. | 137/625.44 |
| 5,205,323 A | * | 4/1993 | Baker | 137/625.44 |
| 5,653,422 A | * | 8/1997 | Pieloth et al. | 137/625.44 |
| 6,003,552 A | * | 12/1999 | Shank et al. | 137/625.44 |
| 6,318,408 B1 | * | 11/2001 | Fukano et al. | 137/625.44 |
| 6,726,173 B2 | * | 4/2004 | Hettinger et al. | 251/129.17 |
| 8,104,510 B2 | * | 1/2012 | Ams et al. | 137/625.44 |

FOREIGN PATENT DOCUMENTS

| | | |
|---|---|---|
| DE | 7324333 | 9/1973 |
| DE | 202009000593 | 3/2009 |

OTHER PUBLICATIONS

German Search Report dated Oct. 12, 2010.

* cited by examiner

*Primary Examiner* — John Rivell
(74) *Attorney, Agent, or Firm* — Carlson, Gaskey & Olds, PC

(57) ABSTRACT

A fluidic control element has a housing that is assembled from first and second housing parts. A control space is formed between the housing parts into which two flow ducts open that are located in the first housing part. A sealing seat is arranged in the control space and is assigned to one of the flow ducts. A diaphragm is clamped between the housing parts. An actuating rocker element mounted for pivotal movement in the second housing part is configured with two lever arms, is movable between an opening position and a closing position, and is firmly attached to the diaphragm in an attachment area opposite the sealing seat. The actuating rocker element is provided with supporting areas for the diaphragm that are adjacent to the attachment area.

7 Claims, 2 Drawing Sheets

FLUIDIC CONTROL ELEMENT

RELATED APPLICATION

This application claims priority to German Application No. 20 2009 016 447.0, which was filed 3 Dec. 2009.

FIELD OF THE INVENTION

The invention relates to a fluidic control element for use in diaphragm valves.

BACKGROUND

Diaphragm valves are known. They have the advantage that a housing and drive are fluidically separated from each other by a diaphragm, which means that no drive part comes into contact with a medium, something which is relevant above all when aggressive media are employed. In this way, it can be prevented that, for example in solenoid valves, components made from a magnetically conductive material that are susceptible to corrosion will be attacked upon contact with a medium.

It is further known to clamp the diaphragm in diaphragm valves between two housing parts. One or more sealing seats may be opened or closed by the diaphragm.

Depending on the application and customer requirement, media are required to be switched even at higher pressures, which results in a high load on the diaphragm.

When designing the diaphragm for diaphragm valves, a trade-off frequently needs to be found with regard to strength and diaphragm thickness since, on the one hand, a high mobility of the diaphragm is necessary, which is to be ensured with as low a drive force as possible while, on the other hand, a high stability and long service life are, of course, also desirable. As a result, the problem of undesirable crack formation frequently occurs in diaphragms under a pressure load.

SUMMARY

A control element, for use in particular in diaphragm valves, ensures the function thereof even under pressure load, without a risk of damage to a diaphragm.

In one example embodiment, a fluidic control element has a housing that is assembled from first and second housing parts having a control space formed between them. The first housing part has at least two flow ducts that open into the control space. At least one of the flow ducts has a sealing seat assigned to it. A diaphragm is clamped between the first and second housing parts. An actuating rocker element is mounted for pivotal movement in the second housing part. The actuating rocker element includes two lever arms. When an actuating force acts on the actuating rocker element, the latter is movable between an opening position and a closing position. The diaphragm, which is attached to the actuating rocker element in an attachment area located opposite the sealing seat, can clear or close the sealing seat. The actuating rocker element includes supporting areas for the diaphragm that are adjacent to the attachment area to give support to the diaphragm. The supporting areas restrict any free movement of the diaphragm. This prevents the diaphragm from being bulged and overstretched in an undesirable manner under a pressure load, which, upon pressure relief, will then result in wrinkling and leaking if the diaphragm no longer reversibly assumes its initial shape, but experiences a permanent deformation. Thus, this valve configuration effectively protects the diaphragm from damage.

In an advantageous embodiment, the supporting areas are in the form of a cylindrical extension arranged on the actuating rocker element and surround the diaphragm attachment area in the form of a continuous annular surface. A symmetrical annular surface corresponds to a circular sealing seat contour and has the advantage that forces occurring are uniformly absorbed, which enhances an optimum sealing effect. In case any other sealing seat contour is used, some other geometry for the supporting areas is, in principle, also conceivable.

In a further embodiment, the control element according to the invention may be made use of in the same manner for a valve in a 3/2-way design with a simple modification of the fluidic housing part and the actuating rocker element of a 2/2-way diaphragm valve. To this end, the first housing part has three flow ducts with two sealing seats formed therein which are arranged on the two outer flow ducts, with all flow ducts opening into the control space. The actuating rocker element includes one attachment area each on each lever arm opposite a corresponding one of the sealing seats, the diaphragm being attached to the actuating rocker element in its respective attachment areas. The actuating rocker element further includes supporting areas on both lever arms which give support to the diaphragm.

In one example embodiment, an inside diameter of the cylindrical extension is greater than a of the valve seat. The attachment area for the diaphragm also constitutes a supporting area for the diaphragm, which roughly corresponds to the circular surface that is surrounded by the valve seat. This means that the overall diaphragm supporting area is increased by the inside diameter of the cylindrical extension, which is greater than the valve seat diameter. This considerably contributes to the stabilization of the diaphragm.

Alternatively, it is also possible to increase the size of the diaphragm attachment area, which also causes the diaphragm supporting area to be enlarged.

In a further embodiment, a free space is formed between the cylindrical extensions and the second housing part for the diaphragm to extend into the free space when the control space is exposed to pressure. This free space ensures the mobility of the diaphragm. The configuration of the cylindrical extensions also determines the geometry of the free space. In this way, the remaining free space into which the diaphragm can expand upon application of pressure is defined and restricted in comparison with known configurations according to the prior art. This has the advantage that the diaphragm is not overstretched even at higher pressures and will not experience any permanent deformation, which results in an increase in the stability of the diaphragm.

The diaphragm is advantageously tied onto form locking fasteners that are part of or firmly connected with, the actuating rocker element. This constitutes a reliable, form-fitting type of connection between the diaphragm and the actuating rocker element. When the diaphragm is not directly connected with fasteners that are part of the actuating rocker element, but with separate fasteners which are then connected to the actuating rocker, the fasteners and the actuating rocker element may be produced from different materials.

According to one embodiment, the actuating rocker element is mounted for pivotal movement on a pin which passes through the actuating rocker element transversely to a direction of longitudinal extent thereof. The pin is firmly anchored in opposite walls of the second housing part. This has the advantage that in applications involving a plurality of valves that are arranged closely side by side in an in-line relationship, no interference of motion can occur between adjacent valves and no undesirable interaction of the valves occurs.

BRIEF DESCRIPTION OF THE DRAWINGS

Further features and advantages of the invention will be apparent from the description below and from the accompanying drawings, to which reference is made and in which.

DETAILED DESCRIPTION

Figure 1:
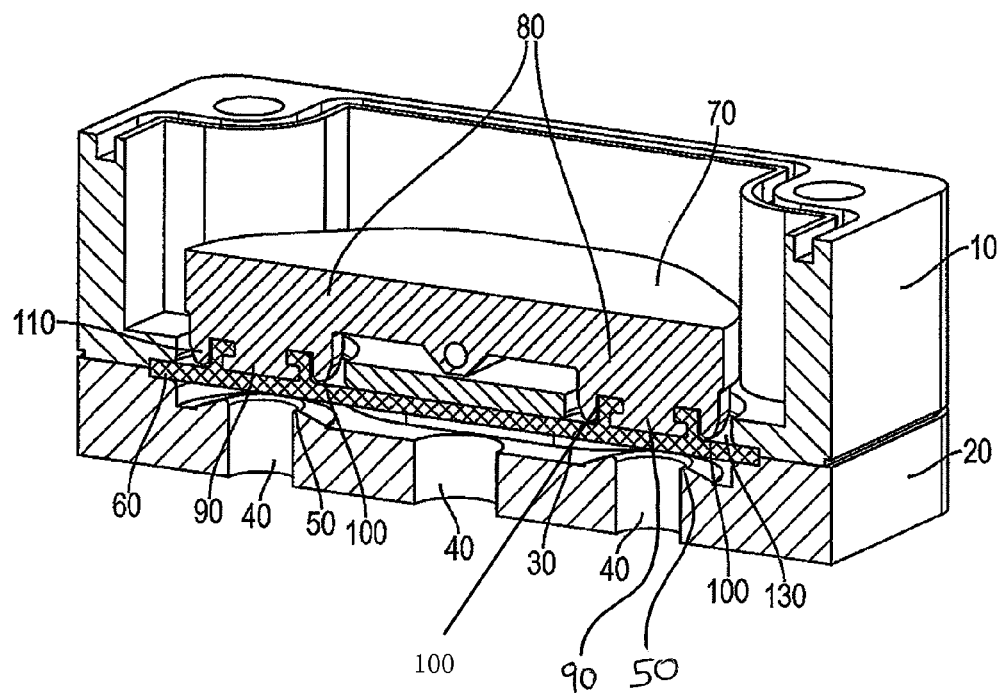
FIG. 1 shows a perspective view of a longitudinal section taken through a fluidic control element according to the invention, in the valve housing.

FIG. 1 shows a fluidic control element in a 3/2-way function including a housing that is assembled from two housing parts 10, 20 having a control space 30 formed between them. Three flow ducts 40 open into the control space 30, with valve sealing seats 50 being assigned to the two outer flow ducts 40. A diaphragm 60 is clamped between the housing parts 10, 20. An actuating element that is in the form of a rocker is mounted for pivotal movement in the housing part 20. Actuating rocker element 70 includes two lever arms 80 having two attachment areas 90 for attachment of the diaphragm 60. The diaphragm attachment areas 90 are located opposite the sealing seats 50. In operation of the actuating rocker element 70, the valve seats 50 are alternately opened and closed. The actuating rocker element 70 has two supporting areas 100 that are adjacent to the attachment areas 90 and give support to the diaphragm 60. While the attachment areas 90 give support to the diaphragm, the adjacent diaphragm supporting areas 100 give additional support to the diaphragm 60 to absorb a pressure force when pressure is applied by a medium penetrating into the control space 30 via a flow duct 40, and thus contribute to the stability of the diaphragm.

Figure 2:
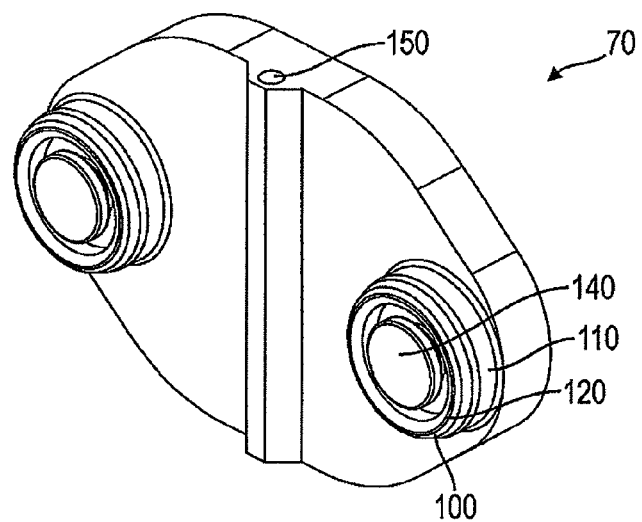
FIG. 2 shows a spatial illustration of the fluidic control element shown in FIG. 1.

As shown in FIG. 2, in one example embodiment, cylindrical extensions 110 are arranged on the actuating rocker element 70 and surround the attachment areas 90 in the form of a continuous annular surface 120.

The fluidic control element according to the invention may, of course, also be employed in devices having a 2/2-way design. In that case, one of the two outer flow ducts is eliminated, while the structure is otherwise completely identical to that of the 3/2-way design. The second supporting area on the actuating rocker element may be implemented optionally, or else it may be dispensed with.

In one embodiment, an inside diameter of the cylindrical extensions 110 is greater than a diameter of the valve seat 50. This increases the overall supporting area for the diaphragm 60. The diaphragm is supported more effectively and therefore stabilized. Particularly, the inner diameter of the cylindrical extensions 110 is greater than the valve seat diameter by approximately twice a diaphragm thickness.

It would also be possible to enlarge the attachment area 90, which likewise results in an enlargement of the overall diaphragm supporting area.

In one embodiment, free spaces 130 are formed between the cylindrical extensions 110 and the housing part 20. The free spaces 130 ensure the required mobility of the diaphragm 60. When a medium pressure is provided under the diaphragm 60, the diaphragm 60 can yield and move into these free spaces 130. The geometry and dimensions of the extensions 110 also co-determine the geometry of the free spaces 130 since the latter are partly delimited by the extensions. When the walls of the cylindrical extensions are thicker, the remaining free spaces for the diaphragm to extend into under pressure are smaller, which also has a positive effect on the stability of the diaphragm.

In one example preferred embodiment, the diaphragm 60 is tied onto form locking fasteners 140 in the attachment areas 90 of the actuating rocker element 70. This ensures a firm and form-fitting connection between the diaphragm 60 and the actuating rocker element 70, and the diaphragm is prevented from becoming detached from the actuating rocker element in operation of the valve.

According to a further embodiment, the actuating rocker element 70 is mounted for pivotal movement on a pin which is firmly anchored in opposite housing walls of the housing part 20. The pin passes through a bore 150 in the actuating rocker element 70 transversely to the longitudinal extent thereof.

Figure 3:
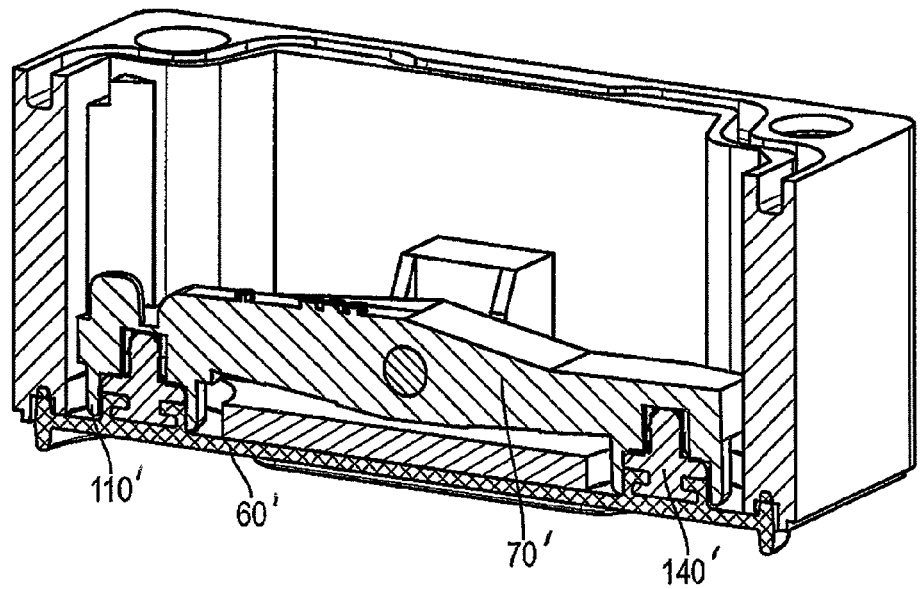
FIG. 3 shows a perspective view of a longitudinal section taken through a further embodiment of a fluidic control element according to the invention, in the valve housing.
Figure 4:
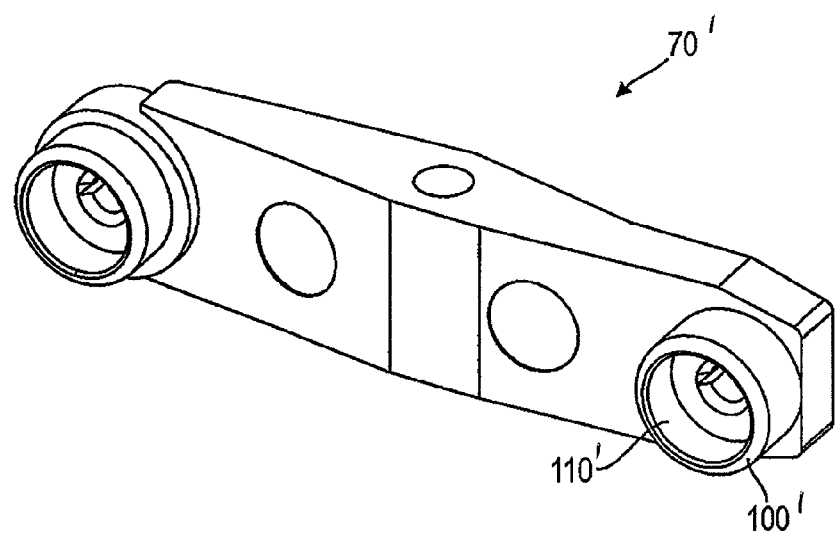
FIG. 4 shows a spatial illustration of the fluidic control element shown in FIG. 3.

FIGS. 3 and 4 illustrate a design variant. An actuating element 70' is substantially in the shape of a bar. A diaphragm 60' is connected to fasteners 140' that are firmly connected with the actuating element 70'. The actuating element 70' includes cylindrical extensions 110' having supporting areas 100' for the diaphragm 60', which give support to the diaphragm 60'.

Although the invention has been described hereinabove with reference to a specific embodiment, it is not limited to this embodiment and no doubt further alternatives will occur to the skilled person that lie within the scope of the invention as claimed.

What is claimed is:

1. A fluidic control element comprising:
   a housing formed by first and second housing parts assembled to define a control space formed between the first and second housing parts;
   at least two flow ducts located in the first housing part and opening into the control space;
   at least one sealing seat arranged in the control space and assigned to one of the at least two flow ducts;
   a diaphragm clamped between the first and second housing parts; and
   an actuating rocker element mounted for pivotal movement in the second housing part and having two lever arms, said actuating rocker element being movable between an opening position and a closing position, and said actuating rocker element being attached to the diaphragm in an attachment area located opposite the at least one sealing seat, and wherein the actuating rocker element further includes at least one diaphragm supporting area adjacent to the attachment area for supporting the diaphragm, and wherein the at least one diaphragm supporting area is a continuous annular surface formed on a cylindrical extension of the actuating rocker element which surrounds the attachment area.

2. The fluidic control element according to claim 1, wherein the at least two flow ducts comprise three flow ducts that are positioned in the first housing part to open into the control space, and wherein the at least one sealing seat comprises two sealing seats arranged in the control space, each of said two sealing seats associated with one of said three flow ducts and a remaining one of said three flow ducts opening into the control space in a position between said two sealing seats, and said actuating rocker element being attached to the diaphragm on each of said lever arms in a position opposite one of said two sealing seats, and the diaphragm being supported by a diagram supporting area next to each of said two sealing seats.

3. The fluidic control element according to claim 1, wherein the diaphragm is tied onto form locking fasteners on said actuating rocker element.

4. The fluidic control element according to claim 1, wherein the actuating rocker element is mounted for pivotal movement on a pin which passes through the actuating rocker element transversely to said lever arms and which is firmly anchored in opposite walls of the second housing part.

5. The fluidic control element according to claim 1, wherein the actuating rocker element is substantially in the shape of a bar.

6. A fluidic control element comprising: a housing formed by first and second housing parts assembled to define a control space formed between the first and second housing parts; at least two flow ducts located in the first housing part and opening into the control space; at least one sealing seat arranged in the control space and assigned to one of the at least two flow ducts; a diaphragm clamped between the first and second housing parts; and an actuating rocker element mounted for pivotal movement in the second housing part and having two lever arms, said actuating rocker element being movable between an opening position and a closing position, and said actuating rocker element being attached to the diaphragm in an attachment area located opposite the at least one sealing seat, and wherein the actuating rocker element further includes at least one diaphragm supporting area adjacent to the attachment area for supporting the diaphragm, and wherein the at least two flow ducts comprise three flow ducts that are positioned in the first housing part to open into said control space, and wherein the at least one sealing seat comprises two sealing seats arranged in the control space, each of said two sealing seats associated with one of said three flow ducts and a remaining one of said three flow ducts opening into the control space in a position between said two sealing seats, and said actuating rocker element being attached to the diaphragm on each of said lever arms in a position opposite one of said two sealing seats, and the diaphragm being supported by a diaphragm supporting area next to each of said two sealing seats, and wherein the actuating rocker element has a diaphragm attachment area on each of said lever arms and a cylindrical extension surrounding each attachment area forming each diaphragm supporting area, each cylindrical extension having an inner diameter that is greater than a valve seat diameter by approximately twice a diaphragm thickness.

7. The fluidic control element according to claim 6, wherein a free space is formed between each cylindrical extension and an inner wall of the second housing part allowing the diaphragm to extend into said free space when the control space is exposed to pressure.

* * * * *